United States Patent Office.

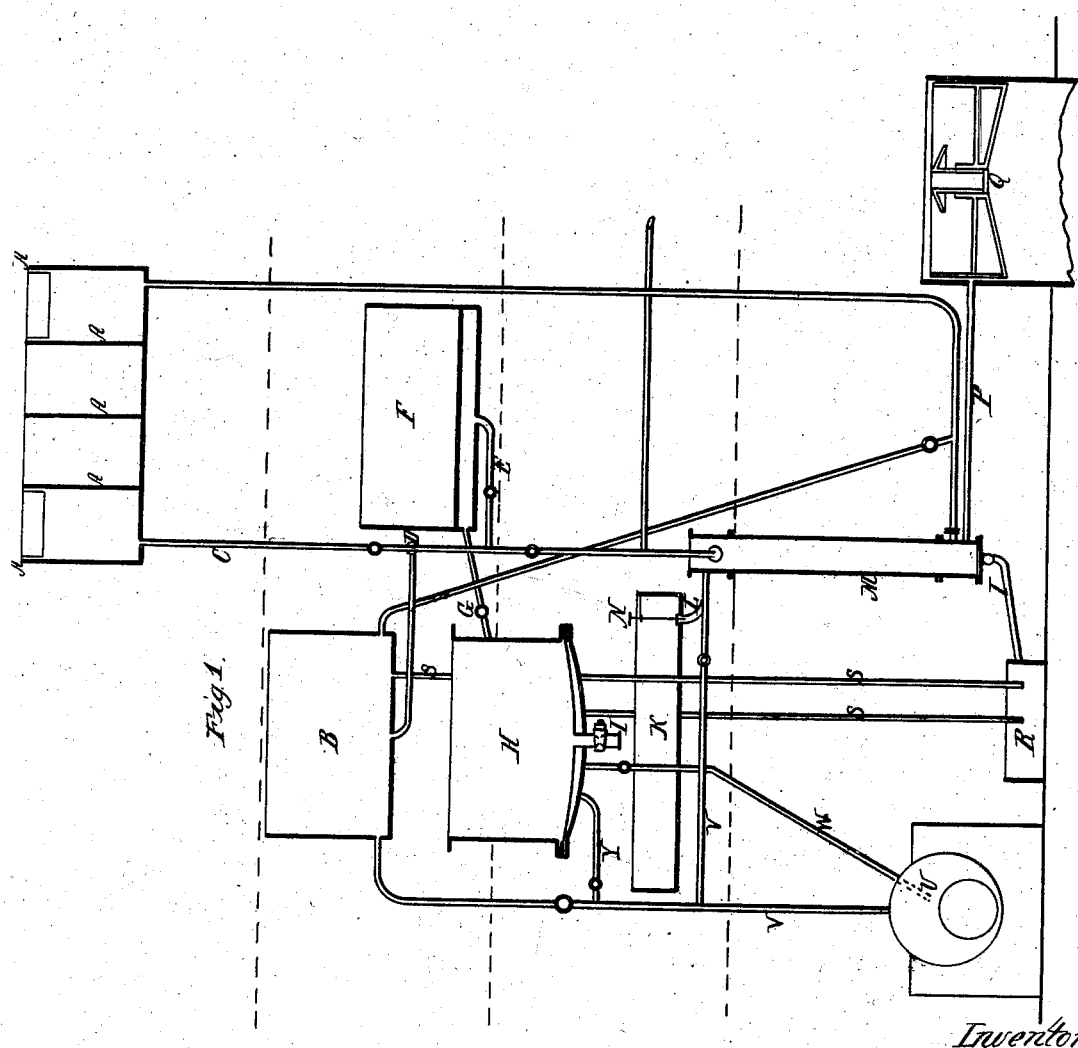

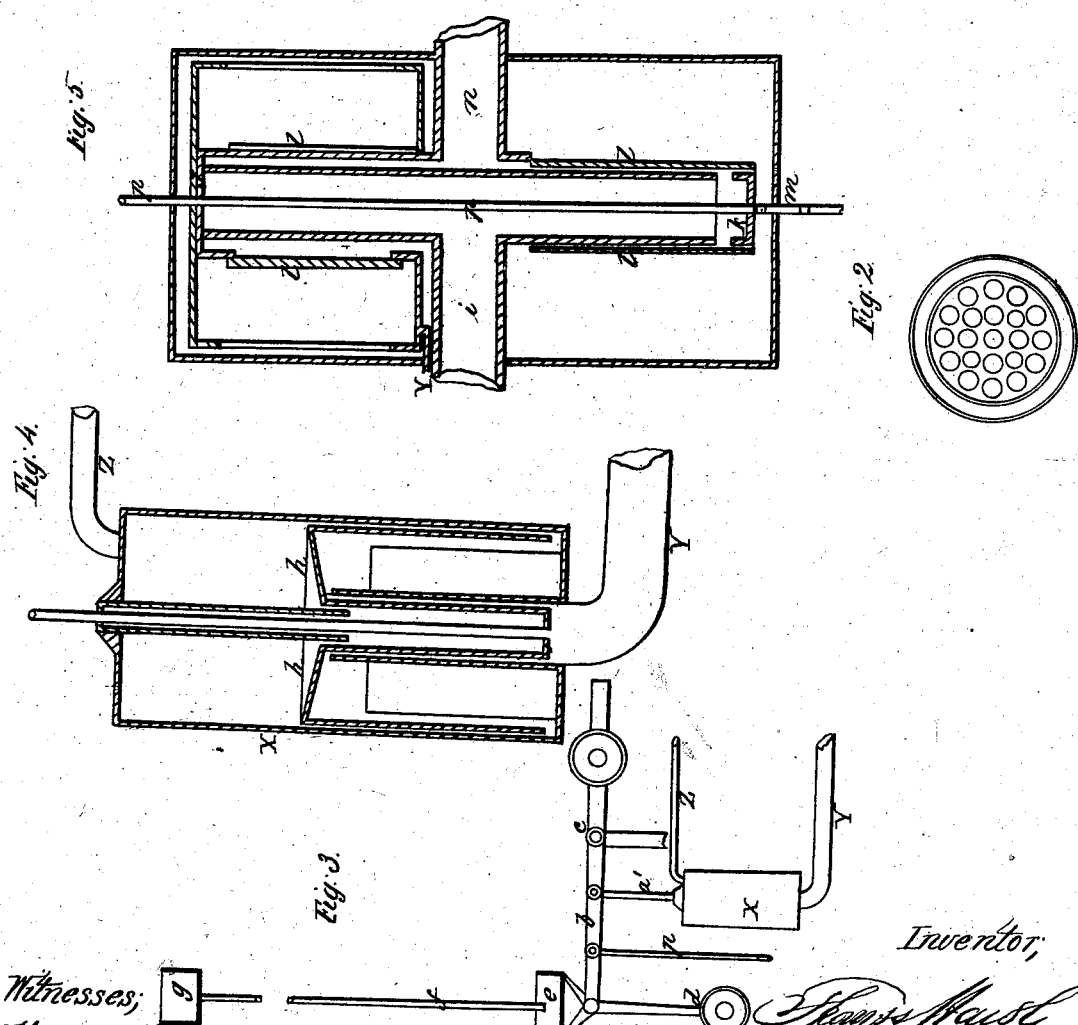

THOMAS HAIGH, OF LIVERPOOL, ENGLAND, AND ROBERT ADAM ROBERTSON, OF PHILADELPHIA, PENNSYLVANIA, ASSIGNORS TO E. F. PRENTISS, WM. D. PHILBRICK, AND WM J. PARSONS.

*Letters Patent No. 64,011, dated April 23, 1867; antedated April 9, 1867.*

IMPROVED APPARATUS FOR BOILING, COOLING, AND FERMENTING MALT LIQUORS.

*The Schedule referred to in these Letters Patent and making part of the same.*

TO ALL WHOM IT MAY CONCERN:

Be it known that we, THOMAS HAIGH and ROBERT ADAM ROBERTSON, both of Liverpool, England, have invented certain new and useful improvements in Apparatus for Boiling, Cooling, and Fermenting Malt Liquors; and we do hereby declare that the following is a full, clear, and exact description of the construction and operation of the same, reference being had to the annexed drawings, forming a part hereof.

Our invention consists, first, in an improved form of pan for boiling the worts in, and which is heated by steam. We prefer to form the pan circular-sided, by using curved sections of cast metal, bolted together by external vertical flanges, and having a steam-tight pipe, double bottom. The lower bottom we, by preference, form of cast metal, the inner surface of which is concave, having a number of vertical stud-pieces cast thereon on which the upper bottom rests. The upper bottom we, by preference, form of copper, and is sufficiently concave to allow the whole of the worts to be drawn off into the hop-back by means of a pipe, the head of which extends through the double bottom, and opens into the centre of the inner bottom of the vessel. This pipe is provided at the upper end with a suitable valve. The steam for heating the pan is introduced between the upper and lower bottoms through a pipe connected with the lower bottom and an ordinary steam boiler. The condensed water escapes by a suitable pipe introduced into the lower portion of the under bottom, and is by that means reconveyed as feed-water to the steam boiler.

The improved cooling or refrigerating apparatus consists of a number of small pipes, placed vertically or at small angles to the vertical line, and arranged round a centre, or any other convenient way, parallel to and a little apart from each other. The ends of the pipes, at the top and bottom, are soldered or screwed into transverse disks, or other suitably shaped plates, the ends of the pipes opening through the upper and lower transverse plates. These small pipes, and the transverse plates to which they are connected, we enclose in a cylindrical or other suitably shaped water-tight casing, which is a little longer than the space between the upper and lower disks, so as to form a small chamber at each end, the outer casing being closed at the ends by suitable covers, which can be removed for the purpose of cleaning the small pipes. A short horizontal branch pipe on the side of the chamber communicates with a vertical pipe, of a capacity equal to about the whole of the smaller enclosed tubes described. This vertical pipe is placed parallel to and a short distance from the outer casing containing the small tubes, and at the reverse end turns at a right angle, and communicates through a small chamber, similar to that from which it leads, with another set of enclosed vertical tubes like those described, and so on as any number of sets of the small vertical pipes, with their transverse plates, enclosures, and so forth, as found desirable, may be used. The interior of the cylindrical casing below the disk through which the small pipes pass, of say the first of the series, we connect with the lower end of the second of the series by an external pipe, and the upper part of the second we connect with the lower end of the second of the series by an external pipe, and the upper part of the second we connect with the lower end of the third of the series, and the third with the fourth, and so on in like manner. The object of this pipe is to form a water passage between the chambers in which the small pipes are enclosed, by which arrangement the exterior of the smaller pipes are surrounded by water between the upper and lower traverse plates, to which they are attached. The liquor to be cooled passes from the hop-back through a pipe into the chamber, on the upper end of the first series of enclosed pipes. It then passes down through the small pipes into the chamber on the lower end thereof; then through a branch pipe into the small chamber on the upper end of the next series of small pipes, where it subdivides and passes down through the small pipes into the chamber at the reverse end, where it again passes through a branch pipe into the upper chamber on the upper end of the third series of small enclosed pipes, and so on through any number of sets of the enclosed pipes, and so forth, as may be found necessary, after which the cooled liquid passes into a working square, which will be hereafter described. The cold water used to surround the small enclosed pipes we draw from a cistern of peculiar description, placed some distance above the refrigerating apparatus, and is introduced into the first part of the series of chambers in which the sets of small pipes are enclosed, at a point near the bottom immediately above the lower traverse plates, to which the small vertical pipes are connected, the water entirely surrounding the small vertical pipes between the upper and lower traverse plates on the upper and lower ends of the pipe. The water is then carried down through a branch pipe on the exterior of the outer casing into the interior of the outer casing of the second of the series, at a point above the plate to which the lower ends of the second of the series of the small pipes are attached, surrounding the pipes, and then passing out through a branch pipe and entering the third of the series of enclosing vessels in the same way, and so on through the whole of the series, when it passes up through a pipe and again returns to the supply cistern, through the bottom near one end. This system of pipes, cisterns, and so forth, may be used with advantage for the purpose of condensing the products of distillation, as well as for cooling and heating liquids; and by using steam in place of water, the apparatus may be used with advantage for heating liquids in their passage through the small pipes. Our improved supply cistern we enclose on the top and sides, and we divide it by vertical partitions into, say, three, four, or more compartments. The heated water passing into one of the end compartments, rises to the top, and the lower stratum of cooler water passes through an opening in the vertical partition, near the bottom of the cistern, into the next compartment, the water in the second compartment escaping through a like side opening into the third compartment, and the water in the third compartment passes into the fourth compartment, and so on, through any number of chambers into which the cistern may be divided, until it arrives at the last, into which the down-supply pipe opens. The object of this arrangement is to prevent the hot and cold water mingling together so readily as it would do if there were no divisions to separate the outlet from the inlet pipes. The vertical partitions we carry above the surface of the water, and, being enclosed at the top and sides, are made use of to form a zigzag passage for a current of air over the surface of the water. The air is admitted at one side of the chamber, immediately above the cold-water supply pipe, and passes to the end of the chamber, thence through a side opening into the next chamber, out of which it passes to the next chamber by a side opening at the reverse end of the next vertical partition into the next compartment, and so on to the last, where it enters a flue which leads the air to the ash-pit of the steam boiler or other furnace, thereby causing a perpetual draught over the surface of the water in the supply cistern.

Our improvements applicable to the working square consist in a hollow floating cover of a peculiar form, and in certain apparatus connected therewith, part of which regulates the temperature of the worts during fermentation. The portion of the apparatus which controls the temperature is self-acting, and may be applied to many useful purposes. The improved floating cover we, by preference, form of copper, with vertical sides which are nearly in contact with the inner side of the square, in which it floats. The under side of the hollow float we construct of a flat pyramidal form, from the apex of which rises a short open tube, which projects a short distance above the upper flat surface of the cover to allow the yeast to work through, when it falls upon the top of the floating cover, whose edges are sufficiently raised to form a tray to receive it. When the worts are in a high state of fermentation, it is sometimes preferred to slip a nose pipe on or into the short vertical pipe, which passes vertically through the cover, conveying the yeast into a suitable receptacle at the side of the square. The gravity of the floating cover we regulate by water introduced or withdrawn from the internal cavity by a flexible or jointed pipe, fitted to and passing through the upper surface of the hollow floating cover. The temperature of the worts in the working square is regulated by an apparatus which consists of a hollow cylindrical or other suitably shaped vessel, having a number of tubes passing through it in a vertical or any other convenient direction. These pipes or tubes are open at each end, forming passages through the body of the vessel, and thereby presenting a large amount of cooling or heating surface in the centre of the body of the worts in which it is immersed. A body of water is conveyed into the body of the temperating vessel by a pipe, and is carried out by another pipe, so that a continuous stream of water may be passed through the temperating vessel. The water-supply valve of the temperating vessel is actuated by the expansion and contraction of the air in the hollow floating cover of the working square, an air pipe being used to connect the interior of the hollow floating cover with the interior of a small apparatus resembling a gasometer, except that mercury is used in place of water in making good the joints, and which we enclose in an air-tight casing having a considerable air space above the inverted vessel or gasometer. The centre of the gasometer is fitted with a vertical tube, which extends vertically down into the body of the vessel, and is open at the top and closed at the bottom, from the centre of which springs a vertical rod, which passes up through the air-tight casing, where it is connected with the lever of the valve which regulates the supply of water to the temperating vessel. The opening in the outer air-tight casing, through which the vertical staff passes, we fit on its under side with a long vertical tubular collar, which surrounds the vertical rod for some distance down into the vertical tube in the top of the gasometer, thereby forming a telescope joint, which we make good by filling or partially filling up with mercury. The supply valve for the temperating we prefer, for the sake of great delicacy of action, to be constructed with a double piston, connected together by a short rod working in a cylinder, the inlet of the supply pipe opening into the small cylinder between the two pistons. One of the pistons we form sufficiently deep to cover, when required, an outlet port on the side of the cylinder, communicating by a pipe with the temperating vessel. In some cases we surround the supply-valve with an elastic-sided chamber, formed of India rubber or other suitable materials, encased so as to prevent it giving laterally, but allowing it to expand and contract on its axis. When this arrangement is used, it is preferred to allow the feed water to pass over the top of the cylinder, in which the turn pistons work into an external casing surrounding the working barrel or cylinder, the water being carried therefrom to the temperating vessel by a pipe. The under side of the piston, at the end from which the feed water passes, is formed at an oblique angle, to allow the opening gradually to enlarge as the piston is withdrawn from the cylinder. The air-tight expanding bag we enclose in an air-tight external casing, which is provided with air taps to regulate the instrument. Our object for encasing the valve-regulating apparatus in air-tight chambers is to exclude the action of the atmosphere as much as possible.

That this our said invention may be the more readily seen and understood, we have hereunto annexed drawings in partial illustration, showing the mode of practically applying the invention. Like letters and figures marked thereon have reference to similar parts.

Figure 1 is a partial sectional elevation of the cold-water supply cistern, hot-liquor pan, mash-tun, wort-copper, hop-back, one of the refrigerating columns, and upper portion of a fermenting square; also a steam boiler, with its tubular connections for heating the wort and liquor pans, and pipe for reconveying the condensed water from the wort pan to the boiler, and a cistern for receiving the condensed water formed in the pipe used for heating the water in the hot-water cistern. In this figure will be seen the system of connecting pipes with their several stop-cock valves.

Figure 2 is a partial horizontal section of one of the refrigerating columns, which, in this case, we have shown constructed with a copper pipe surrounding the whole set of small tubes, but there may be an annular air-chamber between it and the outer casing.

Figure 3 is an external elevation of one of our improved self-acting regulators for controlling the supply of hot or cold water to the temperating apparatus, which governs the temperature of the worts in the working square, and which is equally applicable for regulating the temperature of any liquor contained in any vat or other vessel.

Figure 4 is an enlarged vertical sectional elevation of the body of the regulating apparatus, constructed on the principle of a gasometer, mercury being used to make good the movable joints.

Figure 5 is also an enlarged vertical sectional elevation of the body of the regulating apparatus, constructed with expanding and contracting bags.

A, cold-water supply cistern, with a divisional partition which divides the cistern from the top to bottom into separate chambers, which communicate with each other through lateral openings cut through the bottoms of the partitions at alternate ends: B, water-heating cistern, which is supplied from the feed cistern A through C, pipes which, at their junction, are fitted with D, a two-way tap; E, pipe connecting the water-heating vessel with F, the mash-tun; G, the pipe with taps connecting the mash-tub with H, the double-bottomed wort boiler; I, discharge pipe and tap for running off the contents of the wort boiler into K, the hop-back; L, pipe connecting the hop-back with M, the refrigerating columns; N, stop-valve fitted to the discharge orifice of the hop-back; P, pipe for conveying the worts from the refrigerating columns to Q, upper portion of the fermenting square, with its floating cover; R, a cistern for containing the condensed water received from the water-heating apparatus in the cistern B through S, a pipe extending from the water-heating cistern to the receiver R; T is a pipe for conveying the condensed water from the columns M, when they are used for heating in place of cooling, which is done by turning in steam in place of worts; U, steam-generating boiler used for heating water in cistern B, and boiling the worts in the vessel H; V, steam pipes connecting steam-generating boiler U; X, external casing enclosing the actuating parts of the self-acting regulator; Y is a pipe which communicates between the interior of the hollow floating lid of the fermenting vessel Q and the interior of the enclosed working parts of the regulator; Z is a pipe which connects the air surrounding the enclosed working parts with an air-chamber, which may be placed several feet below the surface of the earth, or in any other convenient situation where the air in the chamber will not be subject to fluctuations of temperature; $a$, the external casing enclosing the working parts of the temperating apparatus; $a'$ is a vertical rod which communicates motion from the dome of the gasometer-shaped working part of the apparatus, or from the expanding and contracting bags to $b$, a horizontal lever, having its fulcrum at $c$, and the outer end of which is fitted with $d$, a vertical pendulum, the head of which is forked, and upon which rests $e$, a vessel containing mercury, and which forms a loose movable bottom vessel for $f$, a barometer tube thirty inches long, which is a fixture, and is formed with $g$, an enlarged head, forming a close chamber making the head of the barometer, and which we construct of such a capacity that the rise or fall of half an inch in the mercury will balance the expansion of eight degrees of heat in the air-chamber of the float, or other bodies of confined air, which actuates the apparatus $h$, gasometer-formed dome, which rises with the expansion and falls by the contraction of the air communicating with the interior thereof; $i$, water-supply pipe; $j$, a cap covering the head of the supply pipe, which is connected to $k$, a cap on the lower end of the vertical portion of the supply pipe, and which is connected externally by $l$, India-rubber tubes, which are surrounded by metal rings to protect them from lateral pressure; $m$, a small India-rubber spring for keeping down the upper cap $j$, when not acted upon from below; $n$, exit pipe; $p$, valve-rod.

Having now fully described and ascertained the nature of this our said invention, and how we believe the same may be best carried into practical effect, we wish it to be understood that we do not confine ourselves to the precise details, relative proportions, or dimensions hereinbefore described and set forth, as it will be readily seen that the same may be considerably varied without departing from the invention; but what we do claim, is—

1. Dividing the supply cistern into several compartments, and arranging a zigzag air passage above the water, communicating with the ash-pit of a steam boiler, or other furnace for generating a draught of air over the surface of the water in the supply cistern, substantially and in the manner hereinbefore described and set forth, or any mere modification of the same.

2. The peculiar mode of constructing the double bottom of the wort-boiling pan, as hereinbefore described and set forth, or any mere modification of the same.

3. Forming the refrigerator columns with small chambers at the top and bottom of the small vertical pipes, as hereinbefore described and set forth, or any mere modification of the same.

4. The peculiar form and arrangement of the floating cover for the fermenting tuns, as hereinbefore described and set forth, or any mere modification of the same.

5. The peculiar construction and arrangement of the various parts of the self-acting temperature-regulating apparatus, and the mode of counteracting the fluctuations in the pressure of the external atmosphere, as hereinbefore described, or any mere modification of the same.

And, lastly, the general arrangement, combination, construction, and use of the apparatus hereinbefore described and set forth, or any mere modification of the same, for the purpose of boiling, cooling, and fermenting malt liquors, or other useful purposes.

In witness whereof we, the said THOMAS HAIGH and ROBERT ADAM ROBERTSON, have hereunto set our hands and affixed our seals this third day of October, in the year of our Lord one thousand eight hundred and sixty-five.

THOMAS HAIGH, [L. S.]
ROBERT ADAM ROBERTSON. [L. S.]

Witnesses:
WM. WALKER, *of 44 Castle Street, Liverpool.*
JOHN HAMDLON REDMOND, *Secretary to the above William Walker.*